United States Patent

Tilly

[11] Patent Number: 5,961,176
[45] Date of Patent: Oct. 5, 1999

[54] MOTOR HOME WITH COLLAPSIBLE BODY

[76] Inventor: Raymond A. E. Tilly, 21 Croft Road, Norbury, London, United Kingdom, SW16 3NG

[21] Appl. No.: 09/130,095
[22] Filed: Aug. 6, 1998
[51] Int. Cl.[6] .................................................. B60D 3/34
[52] U.S. Cl. .......................... 296/165; 296/169; 296/173; 296/174; 296/26.04
[58] Field of Search ................................. 296/165, 169, 296/173, 174, 26.04

[56] References Cited

U.S. PATENT DOCUMENTS

| | | | |
|---|---|---|---|
| 2,493,258 | 1/1950 | Massare | 296/173 |
| 3,170,724 | 2/1965 | Heil | 296/169 |
| 3,286,414 | 11/1966 | Harrison et al. | 296/165 |
| 3,488,085 | 1/1970 | Wallace | 296/173 |
| 3,495,866 | 2/1970 | Bontrager | 296/173 |
| 3,749,439 | 7/1973 | Ferguson | 296/173 |
| 4,603,901 | 8/1986 | McIntosh et al. | 296/165 |

Primary Examiner—Gary C. Hoge

[57] ABSTRACT

A new motor home with collapsible body for allowing for easy travel with the body in a collapsed orientation. The inventive device includes a vehicle portion having a cab portion and a rearwardly extending chassis portion. A body portion is secured to a top portion of the chassis portion of the vehicle portion. The body portion is comprised of an insulated material. The body portion is expandable with respect to the chassis portion. A lifting apparatus is disposed within the chassis portion for selectively raising and lowering the body portion with respect to the vehicle portion.

13 Claims, 3 Drawing Sheets

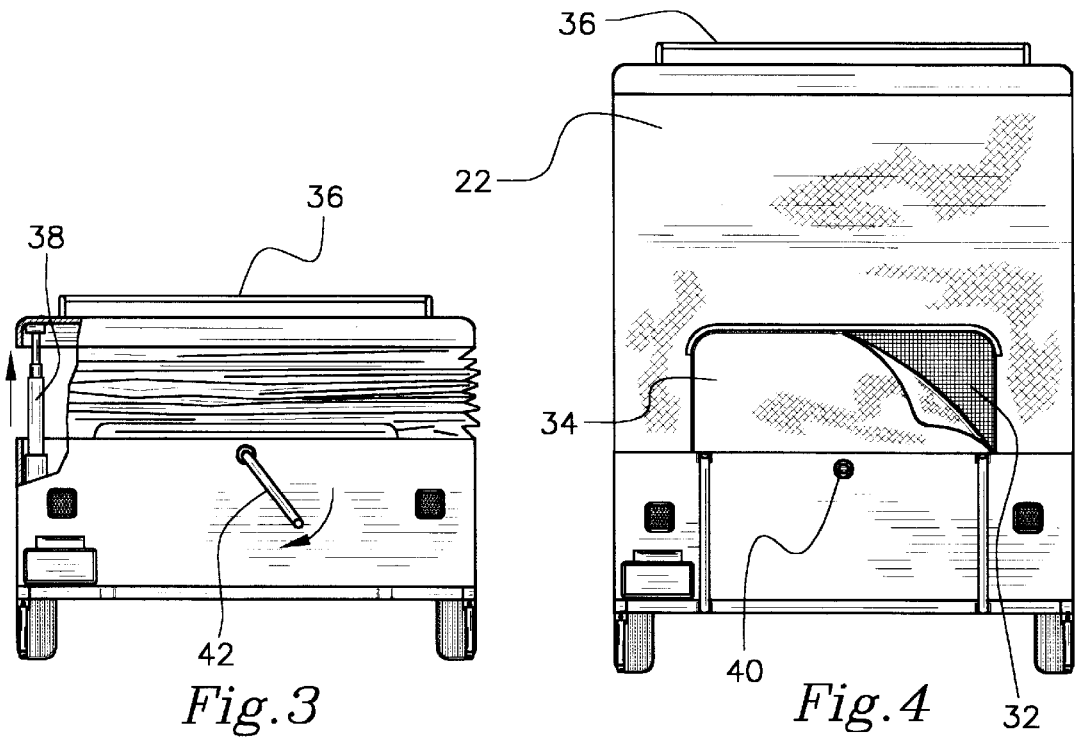
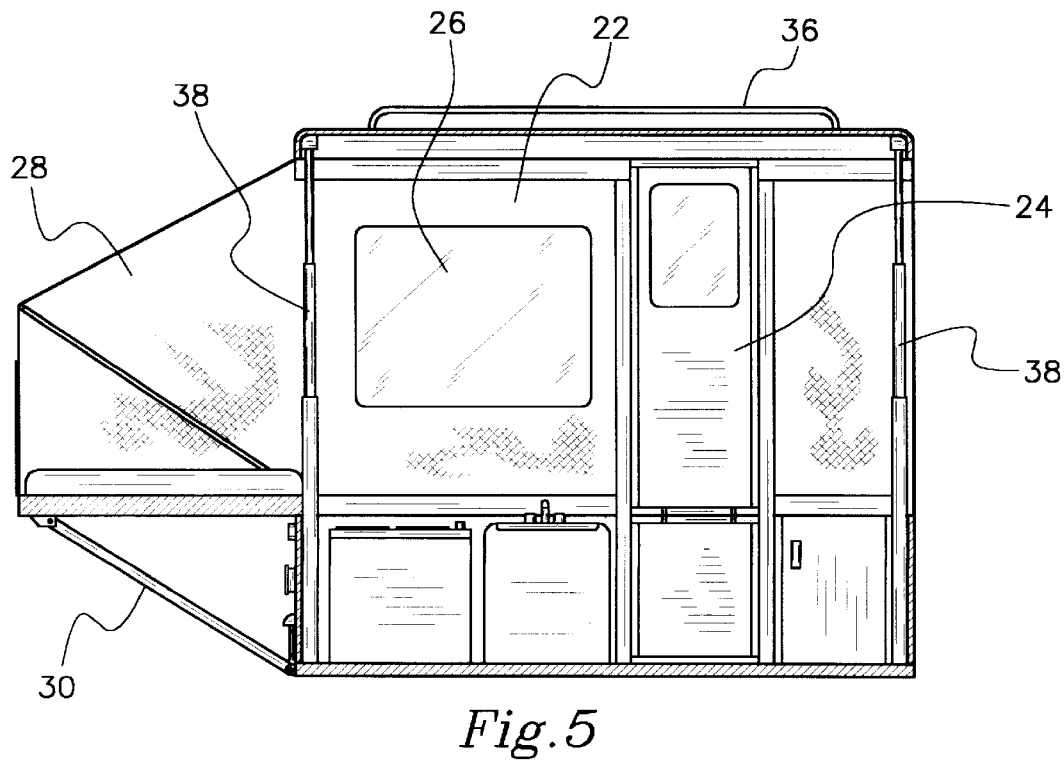

MOTOR HOME WITH COLLAPSIBLE BODY

BACKGROUND OF THE INVENTION

1. Field of the Invention

The present invention relates to expandable trailers and more particularly pertains to a new motor home with collapsible body for allowing for easy travel with the body in a collapsed orientation.

2. Description of the Prior Art

The use of expandable trailers is known in the prior art. More specifically, expandable trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art expandable trailers include U.S. Pat. No. 2,980,465 to Letzler; U.S. Pat. No. 3,186,754 to Winstead; U.S. Pat. No. 3,582,129 to Frank; U.S. Pat. No. 3,744,841 to Schmidt; U.S. Pat. No. 3,175,857 to Lewis; and U.S. Pat. No. Des. 330,183 to Zoromski.

While these devices fulfill their respective, particular objectives and requirements, the aforementioned patents do not disclose a new motor home with collapsible body. The inventive device includes a vehicle portion having a cab portion and a rearwardly extending chassis portion. A body portion is secured to a top portion of the chassis portion of the vehicle portion. The body portion is comprised of an insulated material. The body portion is expandable with respect to the chassis portion. A lifting apparatus is disposed within the chassis portion for selectively raising and lowering the body portion with respect to the vehicle portion.

In these respects, the motor home with collapsible body according to the present invention substantially departs from the conventional concepts and designs of the prior art, and in so doing provides an apparatus primarily developed for the purpose of allowing for easy travel with the body in a collapsed orientation.

SUMMARY OF THE INVENTION

In view of the foregoing disadvantages inherent in the known types of expandable trailers now present in the prior art, the present invention provides a new motor home with collapsible body construction wherein the same can be utilized for allowing for easy travel with the body in a collapsed orientation.

The general purpose of the present invention, which will be described subsequently in greater detail, is to provide a new motor home with collapsible body apparatus and method which has many of the advantages of the expandable trailers mentioned heretofore and many novel features that result in a new motor home with collapsible body which is not anticipated, rendered obvious, suggested, or even implied by any of the prior art expandable trailers, either alone or in any combination thereof.

To attain this, the present invention generally comprises a vehicle portion having a cab portion and a rearwardly extending chassis portion. The chassis portion has a pair of pivotable support legs secured to a lower portion of an outer end thereof. A side portion of the chassis portion has a door coupled thereto. A body portion is secured to a top portion of the chassis portion of the vehicle portion. The body portion is comprised of an insulated material. The body portion is expandable with respect to the chassis portion. The body portion has a door in a side portion thereof corresponding with the door of the chassis portion. The body portion has at least one window. The body portion has a back section for accommodating a bed therein. The back section has a support bar extending downwardly therefrom for securing to a back portion of the chassis portion. The back section has a screen formed therein. The screen has a removable flap. An upper end of the body portion has a luggage rack disposed thereon. A lifting apparatus is disposed within the chassis portion for selectively raising and lowering the body portion with respect to the vehicle portion. The lifting apparatus includes a telescoping jack disposed in each of four corners of the chassis portion. Each of the telescoping jacks are in communication with a socket opening in the back portion of the chassis portion. The socket opening couples with a hand crank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motor home with collapsible body apparatus and method which has many of the advantages of the expandable trailers mentioned heretofore and many novel features that result in a new motor home with collapsible body which is not anticipated, rendered obvious, suggested, or even implied by any of the prior art expandable trailers, either alone or in any combination thereof.

It is another object of the present invention to provide a new motor home with collapsible body which may be easily and efficiently manufactured and marketed.

It is a further object of the present invention to provide a new motor home with collapsible body which is of a durable and reliable construction.

An even further object of the present invention is to provide a new motor home with collapsible body which is susceptible of a low cost of manufacture with regard to both materials and labor, and which accordingly is then susceptible of low prices of sale to the consuming public, thereby making such motor home with collapsible body economically available to the buying public.

Still yet another object of the present invention is to provide a new motor home with collapsible body which provides in the apparatuses and methods of the prior art some of the advantages thereof, while simultaneously overcoming some of the disadvantages normally associated therewith.

Still another object of the present invention is to provide a new motor home with collapsible body for allowing for easy travel with the body in a collapsed orientation.

Yet another object of the present invention is to provide a new motor home with collapsible body which includes a vehicle portion having a cab portion and a rearwardly extending chassis portion. A body portion is secured to a top portion of the chassis portion of the vehicle portion. The body portion is comprised of an insulated material. The body portion is expandable with respect to the chassis portion. A lifting apparatus is disposed within the chassis portion for selectively raising and lowering the body portion with respect to the vehicle portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear view of the present invention illustrated in the collapsed orientation.

FIG. 4 is a rear view of the present invention illustrated in the expanded orientation.

FIG. 5 is a cross-sectional side view of the present invention illustrated in the expanded orientation.

DESCRIPTION OF THE PREFERRED EMBODIMENT

Figure 1:
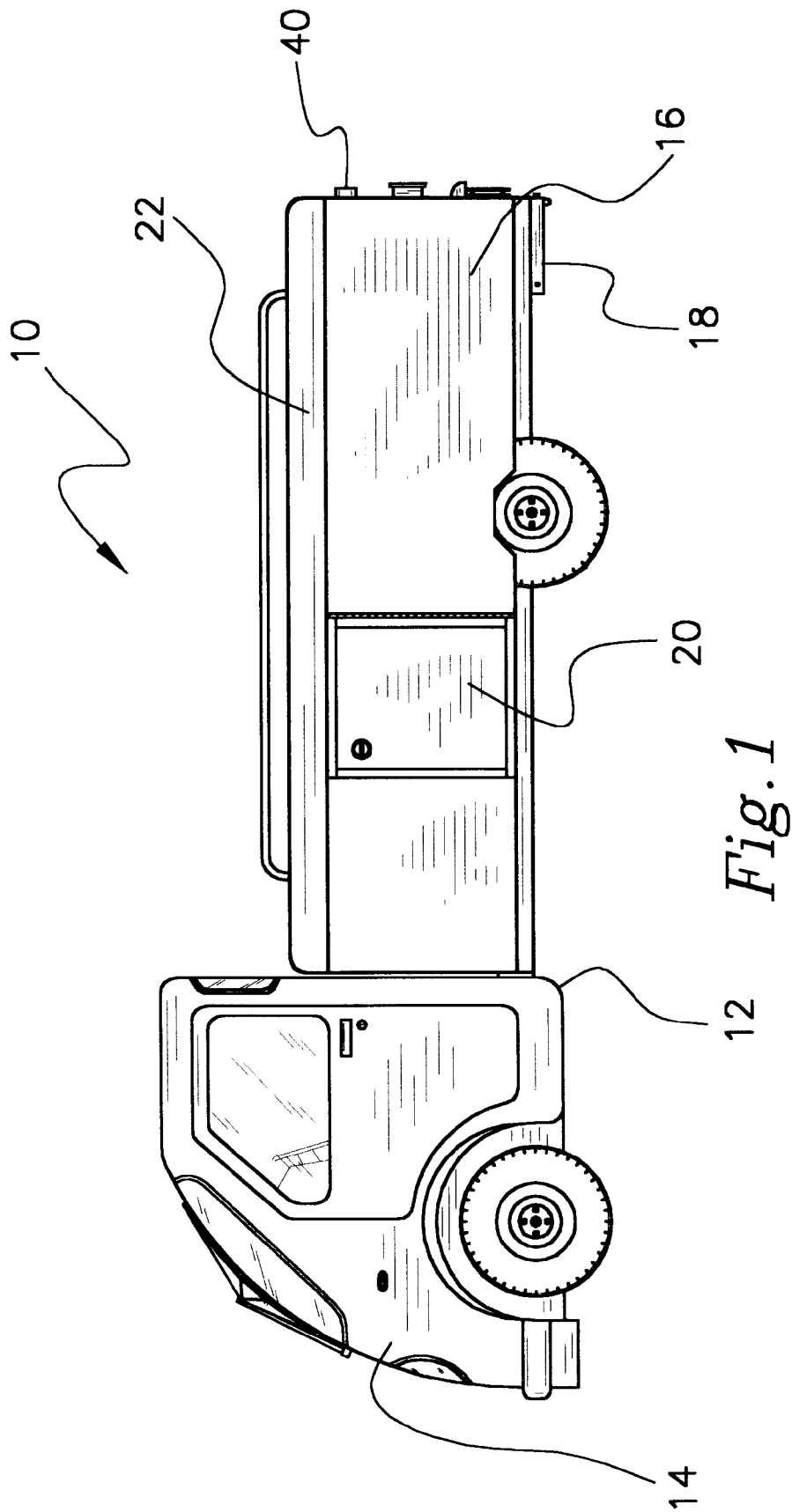
FIG. 1 is a side view of a new motor home with collapsible body according to the present invention illustrated in a collapsed orientation.
Figure 2:
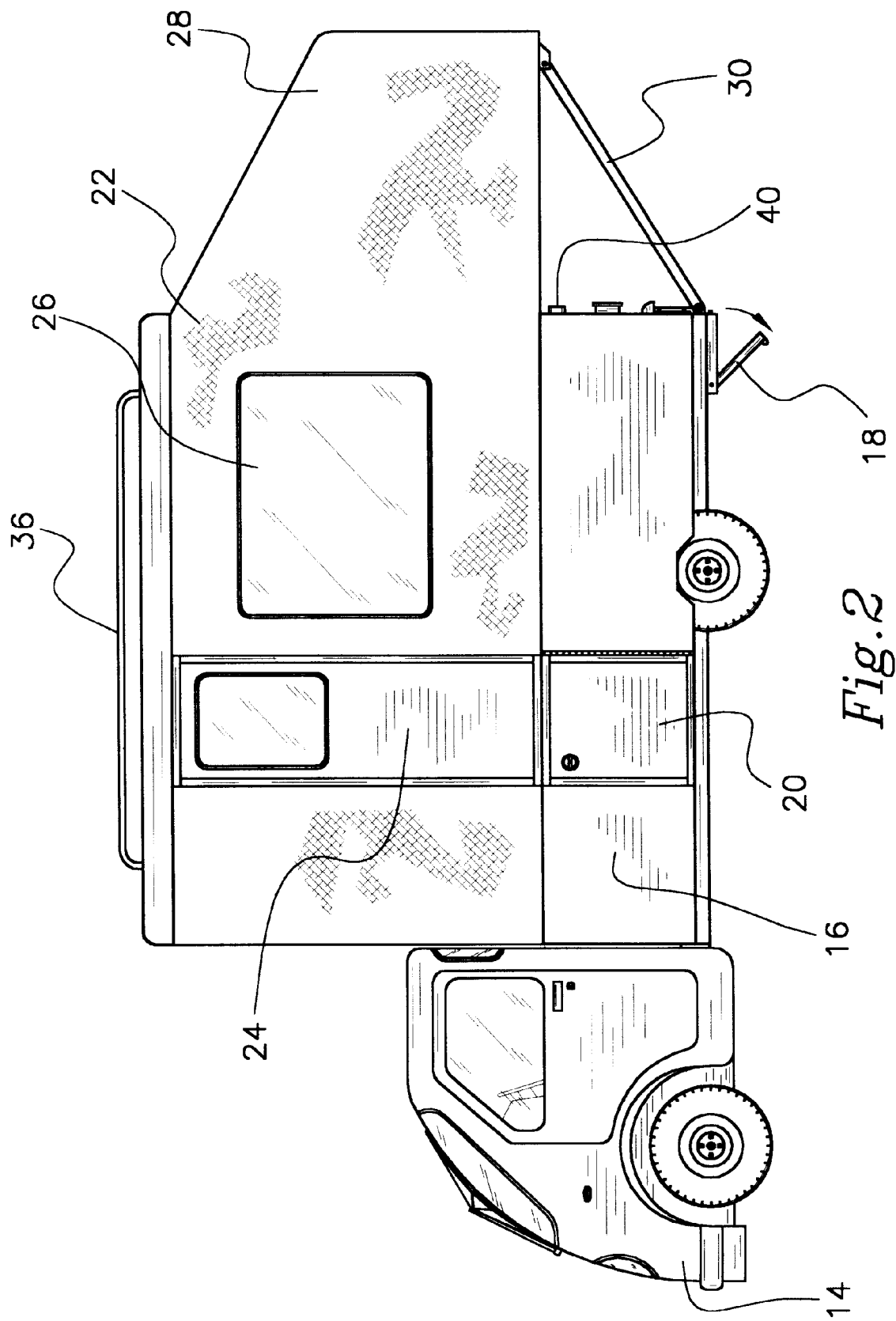
FIG. 2 is a side view of the present invention illustrated in an expanded orientation.

With reference now to the drawings, and in particular to FIGS. 1 through 5 thereof, a new motor home with collapsible body embodying the principles and concepts of the present invention and generally designated by the reference numeral 10 will be described.

As best illustrated in FIGS. 1 through 5, the motor home with collapsible body 10 comprises a vehicle portion 12 having a cab portion 14 and a rearwardly extending chassis portion 16. The chassis portion 16 has a pair of pivotable support legs 18 secured to a lower portion of an outer end thereof. A side portion of the chassis portion 16 has a door 20 coupled thereto.

A body portion 22 is secured to a top portion of the chassis portion 16 of the vehicle portion 12. The body portion 22 is comprised of an insulated material. The body portion 22 is expandable with respect to the chassis portion 16. The body portion 22 has a door 24 in a side portion thereof corresponding with the door 20 of the chassis portion 16. The body portion 22 has at least one window 26. The body portion 22 has a back section 28 for accommodating a bed therein. The back section 28 has a support bar 30 extending downwardly therefrom for securing to a back portion of the chassis portion 16. The back section 28 has a screen 32 formed therein. The screen 32 has a removable flap 34. An upper end of the body portion 22 has a luggage rack 36 disposed thereon.

A lifting apparatus is disposed within the chassis portion 16 for selectively raising and lowering the body portion 22 with respect to the vehicle portion 12. The lifting apparatus includes a telescoping jack 38 disposed in each of four corners of the chassis portion 16. Each of the telescoping jacks 38 are in communication with a socket opening 40 in the back portion of the chassis portion 16. The socket opening 40 couples with a hand crank 42. By rotating the hand crank 42, the telescoping jacks 38 would raise thereby expanding the body portion 22.

In use, the body portion 22 would be collapsed to reduce aerodynamic drag for improved fuel economy and instability from cross winds. Once a desired location is reached, the support legs 18 could be lowered to provided stability and the telescoping jacks 38 could be raised until the body portion 22 is fully expanded. The back section 28 could be folded outwardly and accommodations could be made. The body portion 22 could include all of the amenities associated with standard campers and recreational vehicles, such as refrigerators, stoves, sinks and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motor home with collapsible body for allowing for easy travel with the body in a collapsed orientation comprising, in combination:

a vehicle portion having a cab portion and a rearwardly extending chassis portion, the chassis portion having a pair of pivotable stabilizing support legs secured to a lower portion of an outer end thereof for selectively engaging a ground surface below the vehicle;

the cab portion having a rounded front end extending generally continuously along an arc extending between a front edge of a bottom side and a front edge of a roof of the cab portion;

the chassis portion of the vehicle having a rear side positioned opposite the cab portion and a pair of lateral sides extending between the rear side and the cab portion, one of the lateral sides having a generally rectangular opening therein extending between upper and lower edges of the chassis portion;

a body portion secured to a top portion of the chassis portion of the vehicle portion, the body portion having an interior, the body portion being comprised of an insulated material, the body portion being upwardly expandable with respect to the chassis portion, the body portion having a door in a side portion thereof located above the hinged door of the chassis portion such that the door of the body portion and the hinged door of the chassis portion are adapted to open and close together, the body portion having at least one window located in a side wall of the body portion, the body portion having a back section for accommodating a bed therein, the back section having a support bar extending downwardly therefrom for securing to a back portion of the chassis portion, the back section having a screen formed therein, the screen having a removable flap, an upper end of the body portion having a luggage rack disposed thereon;

the chassis portion having a hinged door for selectively closing the opening of the lateral side of the chassis portion of the vehicle to provide access to the body portion from a location lateral to the chassis portion;

the hinged door of the chassis portion being positioned forward of a rear wheel of the vehicle portion for positioning the weight of persons entering and exiting the body portion between front and rear wheels of the vehicle portion;

wherein the back section of the body portion extends rearwardly and outwardly beyond the back side of the chassis portion of the vehicle in a cantilever fashion to expand the interior of the body portion;

a refrigerator, stove, and sink being positioned in the interior of the body portion;

a lifting apparatus disposed within the chassis portion for selectively raising and lowering the body portion with respect to the vehicle portion, the lifting apparatus including a telescoping jack disposed in each of four corners of the chassis portion, each of the telescoping jacks being in communication with a socket opening in the back portion of the chassis portion, the socket opening coupling with a hand crank.

2. A motor home with collapsible body for allowing for easy travel with the body in a collapsed orientation comprising, in combination:

a vehicle portion having a cab portion and a rearwardly extending chassis portion;

a body portion secured to a top portion of the chassis portion of the vehicle portion, the body portion being comprised of an insulated material, the body portion being expandable with respect to the chassis portion;

the chassis portion of the vehicle having a rear side positioned opposite the cab portion and a pair of lateral sides extending between the rear side and the cab portion, one of the lateral sides having a generally rectangular opening therein extending between upper and lower edges of the chassis portion;

the chassis portion having a hinged door for selectively closing the opening of the lateral side of the chassis portion of the vehicle;

the body portion having a door in a side portion thereof corresponding with the hinged door of the chassis portion; and a lifting apparatus disposed within the chassis portion for selectively raising and lowering the body portion with respect to the vehicle portion.

3. The motor home with collapsible body as set forth in claim 2 wherein the chassis portion has a pair of pivotable support legs secured to a lower portion of an outer end thereof.

4. The motor home with collapsible body as set forth in claim 2 wherein the cab portion has a rounded front end extending generally continuously along an arc extending between a front edge of a bottom side and a front edge of a roof of the cab portion.

5. The motor home with collapsible body as set forth in claim 2 wherein the hinged door of the chassis portion is positioned forward of a rear wheel of the vehicle portion.

6. The motor home with collapsible body as set forth in claim 2 wherein the body portion has at least one window.

7. The motor home with collapsible body as set forth in claim 2 wherein the body portion has a back section for accommodating a bed therein, the back section of the body portion extending outwardly beyond a back side of the chassis portion of the vehicle.

8. The motor home with collapsible body as set forth in claim 7 wherein the back section has a support bar extending downwardly therefrom for securing to a back portion of the chassis portion.

9. The motor home with collapsible body as set forth in claim 2 wherein the back section has a screen formed therein, the screen having a removable flap.

10. The motor home with collapsible body as set forth in claim 2 wherein an upper end of the body portion has a luggage rack disposed thereon.

11. The motor home with collapsible body as set forth in claim 2 wherein the lifting apparatus includes a telescoping jack disposed in each of four corners of the chassis portion.

12. The motor home with collapsible body as set forth in claim 11 wherein each of the telescoping jacks are in communication with a socket opening in the back portion of the chassis portion, the socket opening coupling with a hand crank.

13. The motor home with collapsible body as set forth in claim 2 further comprising a refrigerator, stove, and sink being positioned in said body portion.

* * * * *